No. 693,655. Patented Feb. 18, 1902.
A. KLEIN.
AUTOMATIC REVERSING TAPPING ATTACHMENT FOR LATHES.
(Application filed Apr. 10, 1901.)
(No Model.) 2 Sheets—Sheet 1.
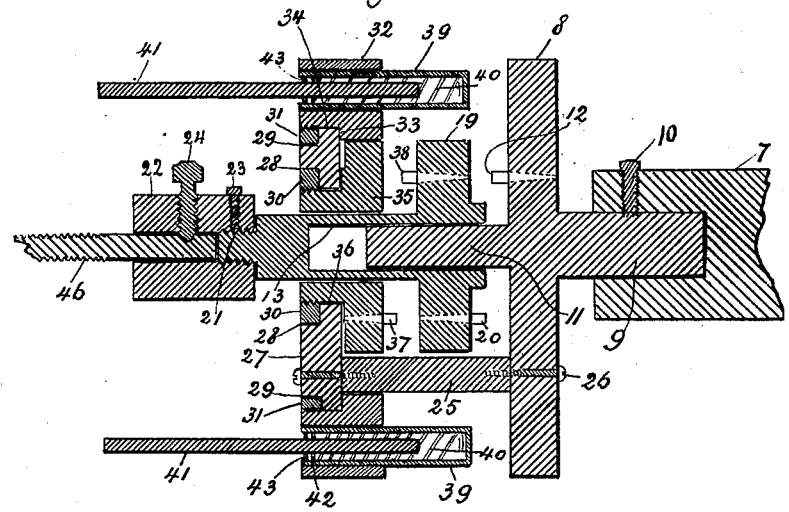
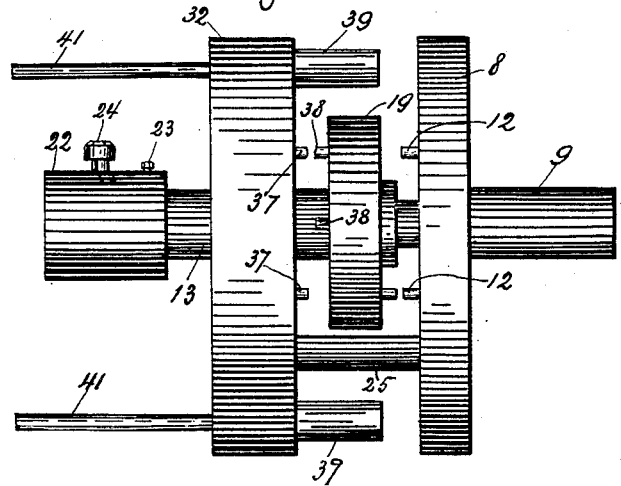

No. 693,655. Patented Feb. 18, 1902.
A. KLEIN.
AUTOMATIC REVERSING TAPPING ATTACHMENT FOR LATHES.
(Application filed Apr. 10, 1901.)
(No Model.) 2 Sheets—Sheet 2.
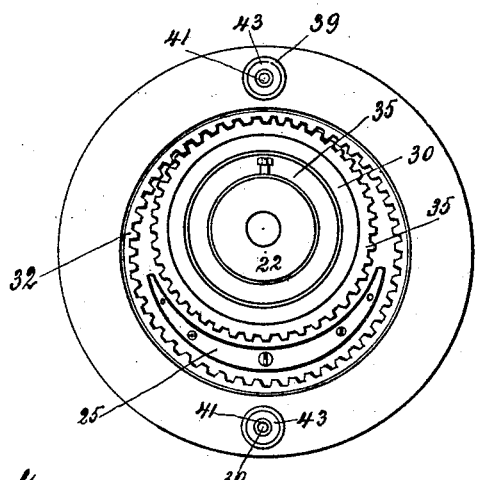
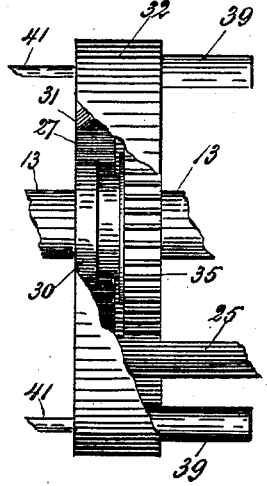
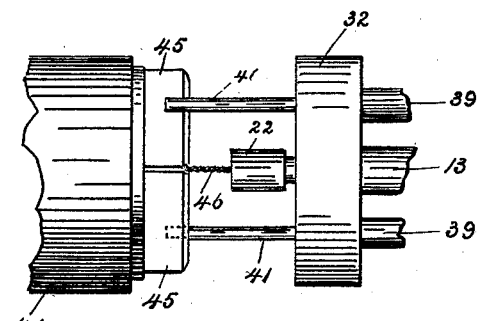

UNITED STATES PATENT OFFICE.

ADOLF KLEIN, OF NEW YORK, N. Y.

AUTOMATIC REVERSING TAPPING ATTACHMENT FOR LATHES.

SPECIFICATION forming part of Letters Patent No. 693,655, dated February 18, 1902.

Application filed April 10, 1901. Serial No. 55,165. (No model.)

*To all whom it may concern:*

Be it known that I, ADOLF KLEIN, a citizen of Hungary, residing at New York, in the county of New York and State of New York, have invented certain new and useful Improvements in Automatic Reversing Tapping Attachments for Lathes, of which the following is a full and complete specification, such as will enable those skilled in the art to which it appertains to make and use the same.

The object of this invention is to provide an improved automatic reversing attachment for lathes and other machines of this class; and with this and other objects in view the invention consists in the combination and arrangement of parts hereinafter described and claimed.

The invention is fully disclosed in the following specification, of which the accompanying drawings form a part, in which the separate parts of my improvement are designated by the same reference characters in each of the views, and in which—

Figure 1 is a sectional side view of my improved lathe attachment and showing the parts of a lathe in connection with which it operates; Fig. 2, a side view of the construction shown in Fig. 1; Fig. 3, a plan view of a detail of the construction; Fig. 4, a view similar to Fig. 2 of a part of the construction shown in Fig. 2, part thereof being broken away; and Fig. 5, a view similar to Fig. 2, showing the rotating chuck and the parts of my improvement which operate in connection therewith.

In the drawings forming part of this specification I have shown at 7 the longitudinally-adjustable lathe-head of a lathe-machine, with which is connected a plate 8, which is preferably circular in form, this connection being made by means of a shank 9, which fits in the lathe-head 7 and is secured therein by a set-screw 10 or in any desired manner, and the plate 8 is provided on the front face thereof and preferably centrally thereof, or substantially so, with a forwardly-directed shank 11 and with a radially-arranged clutch pin or pins 12, and mounted on the shank 11 is a sleeve 13, the end of which adjacent to the plate 8 is provided with a circular head 19, having on the side thereof adjacent to the plate 8 a clutch pin or pins 20, adapted to engage with the clutch pin or pins 12, and the front end of the sleeve 13 is solid in cross-section and reduced in size and screw-threaded, as shown at 21, so as to form a connection for the tool-holder 22, which is screw-threaded thereonto and held in place by a set-screw 23, and the tool-holder 22 is also provided with a set-screw 24, which serves to hold the tool in place.

The plate 8 is provided at one side with a forwardly-directed segmental support 25, which is secured thereto, as shown in the drawings, by screws 26, or which may be formed integrally therewith, if desired, and secured to the end of the support 25 opposite the plate 8 is an annular plate 27, through which the sleeve 13 passes, centrally thereof, and said annular plate 27 is provided in the front surface thereof with an inner rabbet-groove 28 and an outer rabbet-groove 29, and said grooves are provided, respectively, with rings 30 and 31.

A large gear-wheel 32 incloses the annular plate 27 and is provided with an internal gear 33, and said gear-wheel 32 is screwed onto the ring 31, and that portion thereof on which the internal gear 33 is formed extends inwardly, so as to form a groove 34, in which the perimeter of the annular plate 27 fits. A smaller internal gear 35 is placed in the larger gear 32 and is arranged eccentrically therein, as shown in Fig. 3, while the sleeve 13 passes centrally through the internal and smaller gear and is therefore arranged eccentrically in the larger or external gear 32.

The internal gear 35 is L-shaped in cross-section and is screwed onto the ring 30, and is thus provided with a groove 36, in which the inner perimeter of the annular plate 27 fits, and both of said gears 32 and 35 are thus held in position and in engagement by the annular plate 27.

The annular plate 27, as shown in the drawings, is secured to the support 25 by screws, but may be formed integrally therewith, if desired, and the back surface of the internal gear-wheel 35 is provided with a clutch pin or pins 37, adapted to operate in connection with a corresponding clutch pin or pins 38, secured to the outer or front surface of the circular head 19.

The larger or external gear 32 is provided at its opposite sides with a tube or sleeve 39, and these tubes or sleeves pass through said gear-wheel and are flush with the front face thereof and extend backwardly rearwardly of the back face thereof, and said tubes or sleeves are open at their front ends, and placed in each is a spring 40, and said tubes or sleeves are also each provided with a longitudinally-movable pin or finger 41, and each of said fingers or pins is provided with lugs or projections 42, on which the springs 40 bear, and each of the said tubes or sleeves is provided at its open end with a closing device 43 for holding the pins or fingers 41 therein, and it will be apparent that the springs 40 operate to force the pins or fingers outwardly at all times.

In Fig. 3 I have shown at 44 an ordinary chuck provided with jaws 45, which hold the work or material to be operated upon, and it will be understood that in practice when the machine is in operation the chuck 44 is rapidly revolved.

In Figs. 1 and 5 I have also shown at 46 an ordinary tap, for which any other tool or instrument may be substituted when desired, and the operation of the device will be understood from the foregoing description when taken in connection with the accompanying drawings and the following statement thereof.

It will be understood that the material to be operated upon is placed between the jaws 45 of the chuck 44 in the usual manner, and said chuck is revolved in the usual manner. The lathe-head 7 is then moved forwardly until the tap 46 comes in contact with the work, and the revolution of the chuck 44 draws the tap into the work or the object to be operated upon. It will also be understood that the lathe-head 7 is so set as to be capable of being moved forward to a predetermined point, and when the tap comes in contact with the material on which it is designed to work the pins or fingers 41 strike the jaws 45 of the chuck, and the wheels 32 and 35 are revolved both in the same direction as the chuck. When the work has proceeded to a predetermined point, the clutch pin or pins 20 on the circular head 19 will be disengaged from the clutch pin or pins 12 on the plate 8, it being understood that the circular head 19 moves forwardly with the tap and at this time the lathe-head 7 is moved backwardly and the clutch pin or pins 37 on the internal gear 35 engage with the clutch pin or pins 38 on the circular head 19, and said circular head, with which the tool or tap 46 is connected, is turned in the same direction as said gear-wheels, but more rapidly than the external gear 32, which is in connection with the jaws 45 of the chuck, and this increased movement of the circular head 19 withdraws the tap or drill from the work, this operation being accomplished by reason of the fact that the said tap or drill is turned more rapidly than the chuck 44. By means of this construction it is not necessary to reverse the movement of the chuck 44, all that is necessary being to move the lathe-head 7 backwardly in order to withdraw the tap or drill from the material or work.

This device is simple in construction and operation and perfectly adapted to accomplish the result for which it is intended, and I reserve the right to make all such alterations in the construction herein described as clearly come within the scope of the invention.

It is not absolutely necessary, of course, that the pins or fingers 46 engage with the chuck-jaws 45, as there are lathes provided with chucks which do not employ such jaws; but in this event the fingers or pins 46 could be made to engage with the body of the chuck itself, either directly or by use of devices connected with the chuck, and in connection with which the pins or fingers 46 would operate.

Having fully described my invention, what I claim as new, and desire to secure by Letters Patent, is—

1. A lathe provided with the usual longitudinally-movable lathe-head and revoluble chuck, a plate connected with said head and provided with a forwardly-directed shank, a sleeve mounted on said shank and provided at its rear end with a circular head adapted to engage said plate and at its front end with a tool-holder, an annular plate connected with said first-named plate, a gear-wheel supported thereby and through which said sleeve passes, a larger gear-wheel also supported by said plate and inclosing said first-named gear-wheel, and operating in connection therewith, the first-named gear-wheel being smaller than and arranged eccentrically in the larger gear-wheel, said smaller gear-wheel and said circular head being adapted to engage, and spring-operated devices for connecting the larger or outer gear-wheel with the chuck, substantially as shown and described.

2. An apparatus of the class described, comprising a support, a tool-holder longitudinally movable thereon and provided at one end with a head adapted to engage said support, and at the opposite end with a device for holding a tool, a circular support between the ends of the tool-holder and connected with the first-named support, a large gear-wheel mounted thereon and provided with an internal gear, a smaller gear-wheel also mounted on said circular support and arranged eccentrically in the first-named gear-wheel, and adapted to be operated thereby and also adapted to engage the head of the tool-holder which passes therethrough, substantially as shown and described.

3. A device of the class described adapted for use in connection with a lathe, comprising a plate adapted to be connected with the longitudinally-movable lathe-head, a longitudinally-movable member connected with said plate and provided at one end with a head adapted to engage said plate and at the opposite end with a tool-holder, a circular support connected with said plate and through which said longitudinally-movable member passes, a small gear-wheel mounted on said longitudinally-movable member and held in position by said circular plate, a larger gear-wheel inclosing the first-named gear-wheel and arranged eccentrically thereto and also held in position by said circular support, and spring-operated devices connected with the larger gear-wheel and adapted to engage the chuck-head of the drill, said smaller gear-wheel being also adapted to engage the head of the longitudinally-movable member, substantially as shown and described.

4. An attachment for lathes comprising a support adapted to be connected with the longitudinally-movable lathe-head, a tool-holder longitudinally movable on said support, a revoluble chuck, and devices for turning the tool in the same direction as and more rapidly than the chuck, substantially as shown and described.

5. The combination with a lathe provided with a longitudinally-movable lathe-head and a revoluble chuck of a longitudinally-movable tool-holder mounted between the lathe-head and the chuck, and devices operating in connection with the tool-holder, and the chuck for turning the tool-holder in the same direction and more rapidly than the chuck, substantially as shown and described.

In testimony that I claim the foregoing as my invention I have signed my name, in presence of the subscribing witnesses, this 9th day of April, 1901.

ADOLF KLEIN.

Witnesses:
F. A. STEWART,
F. F. TELLER.